United States Patent
Henry et al.

(10) Patent No.: US 7,162,612 B2
(45) Date of Patent: Jan. 9, 2007

(54) MECHANISM IN A MICROPROCESSOR FOR EXECUTING NATIVE INSTRUCTIONS DIRECTLY FROM MEMORY

(75) Inventors: G. Glenn Henry, Austin, TX (US); Arturo Martin-de-Nicolas, Austin, TX (US); Terry Parks, Austin, TX (US)

(73) Assignee: IP-First, LLC, Fremont, CA (US)

( * ) Notice: Subject to any disclaimer, the term of this patent is extended or adjusted under 35 U.S.C. 154(b) by 367 days.

(21) Appl. No.: 10/761,845

(22) Filed: Jan. 21, 2004

(65) Prior Publication Data

US 2004/0153630 A1 Aug. 5, 2004

Related U.S. Application Data

(63) Continuation-in-part of application No. 09/640,118, filed on Aug. 16, 2000.

(51) Int. Cl.
*G06F 5/00* (2006.01)
(52) U.S. Cl. .................................................. 712/209
(58) Field of Classification Search ................ 712/209, 712/208
See application file for complete search history.

(56) References Cited

U.S. PATENT DOCUMENTS

| | | | |
|---|---|---|---|
| 4,156,900 A | 5/1979 | Gruno et al. | |
| 4,245,302 A | 1/1981 | Amdahl | |
| 5,148,532 A | 9/1992 | Narita et al. | |
| 5,235,686 A | 8/1993 | Bosshart | |
| 5,396,634 A | 3/1995 | Zaidi et al. | |
| 5,481,684 A | 1/1996 | Richter et al. | |
| 5,581,717 A | 12/1996 | Boggs et al. | |
| 5,638,525 A | 6/1997 | Hammond et al. | |
| 5,685,009 A * | 11/1997 | Blomgren et al. | ............ 712/23 |
| 5,781,750 A | 7/1998 | Blomgren et al. | |
| 5,787,241 A | 7/1998 | Henry et al. | |
| 5,812,913 A | 9/1998 | Morris et al. | |
| 5,832,299 A * | 11/1998 | Wooten | ......................... 710/9 |
| 5,898,867 A * | 4/1999 | Getzlaff et al. | ............. 712/248 |
| 5,930,490 A | 7/1999 | Bartkowiak | |
| 5,968,162 A | 10/1999 | Yard | |
| 6,041,403 A | 3/2000 | Parker et al. | |

(Continued)

OTHER PUBLICATIONS

Hennessy et al; "Computer Architecture: A Quantitative Approach". Second Edition. San Francisco, CA; Morgan Kaufmann Publishers, Inc., 1996. pp. 80-82.

*Primary Examiner*—Eric Coleman
(74) *Attorney, Agent, or Firm*—Richard K. Huffman; James W. Huffman

(57) ABSTRACT

An microprocessor apparatus and method are provided for executing native instructions directly from memory. The apparatus includes instruction translation logic and bypass logic. The instruction translation logic retrieves macro instructions provided via an external instruction bus, and translates each of the macro instructions into associated native instructions for execution. If a first form of a first macro instruction is retrieved, the instruction translation logic directs the microprocessor to enable a native bypass mode and indicates such by asserting a first bit within a control register. The bypass logic is coupled to the instruction translation logic. The bypass logic accesses the first bit within the control register to determine if the native bypass mode has been enabled, and detects wrapper macro instructions and, upon detection of the wrapper macro instructions, disables the instruction translation logic, and provides the native instructions for execution by the microprocessor, thereby bypassing the instruction translation logic.

23 Claims, 8 Drawing Sheets

U.S. PATENT DOCUMENTS

| | | |
|---|---|---|
| 6,243,786 B1 * | 6/2001 | Huang et al. ............... 710/262 |
| 6,618,801 B1 * | 9/2003 | Knebel et al. .............. 712/215 |
| 6,625,759 B1 * | 9/2003 | Petsinger et al. ............. 714/28 |
| 6,643,800 B1 * | 11/2003 | Safford et al. ................ 714/35 |
| 7,000,094 B1 * | 2/2006 | Nevill et al. ................ 712/209 |

* cited by examiner

*Indirect Specification of Native Register via Macro Instruction*

— 200

| CYCLE | MACRO INS BUS | NATIVE INS BUS |
|---|---|---|
| 1 | ADD [EAX],FFFFFFFFh | +++ |
| 2 | *** | LD NR1,[EAX] |
| 3 | *** | ADD NR1,NR1,FFFFFFFFh |
| 4 | *** | ST [EAX],NR1 |

3 CYCLES

Translator Bypass for Native Instructions

Translate Stage Logic for Native Instruction Bypass Mode

Fig. 6

*Instruction Sequence for Testing Native Registers* — 600

| CYCLE | MACRO INS BUS | NATIVE INS BUS |
|---|---|---|
| 1 | MOV EAX,*TST1* | +++ |
| 2 | MOV EBX,*OUTBFR* | LD EAX,*TST1* |
| 3 | NBRANCH | LD EBX,*OUTBFR* |
| 4 | LD T1,0 | JMP [EAX] |
| 5 | ST [EBX],T1 | LD T1,0 |
| 6 | NOT T1 | ST [EBX],T1 |
| 7 | ST [EBX],T1 | NOT T1 |
| 8 | *** | ST [EBX],T1 |
| 9 | *** | +++ |
| 1001 | XRET | +++ |
| 1002 | NEXT MAC | JMP [EAX+1] |
| 1003 | *** | NEXT MAC |

*Microprocessor for Executing Native Applications*

Interrupt-Transparent Native Application Instruction Sequence

US 7,162,612 B2

MECHANISM IN A MICROPROCESSOR FOR EXECUTING NATIVE INSTRUCTIONS DIRECTLY FROM MEMORY

CROSS-REFERENCE TO RELATED APPLICATIONS

This application is a continuation-in-part of co-pending U.S. patent application Ser. No. 09/640,118 entitled TRANSLATOR BYPASS MODE FOR NATIVE INSTRUCTIONS, which was filed on Aug. 16, 2000.

BACKGROUND OF THE INVENTION

1. Field of the Invention

This invention relates in general to the field of instruction processing in computer systems, and more particularly to an apparatus that allows a microprocessor to execute application programs directly from memory, where the application programs are coded using native micro instructions.

2. Description of the Related Art

Microprocessors execute application programs in order to automate certain tasks such as regulating the temperature of a heating element within a coffee maker, controlling the distribution of money from an automated teller machine, or processing numbers on a spreadsheet according to an operator-entered formula on a desktop computer.

The programming instructions used to write application programs for early microprocessors were unique to each particular microprocessor. For example, The Intel® 4004 microprocessor, produced in the early 1970's, had 46 instructions from which a programmer could choose to write application programs. And the programs that were written for the 4004 would only execute on the 4004.

Since the early 1970's, hundreds of different microprocessor designs have been developed. And while many of these microprocessors were original designs, some manufacturers attempted to capture market segments by developing clone microprocessors which were capable of executing application programs that were originally coded to execute on a different microprocessor. The importance of being able to execute "legacy" applications became exceedingly prevalent in the art in 1979 when the Department of Defense (DoD) affirmed its substantial investment in applications programming by issuing MIL-STD-1750, a military standard documenting the high-level design features of a conceptual 16-bit microprocessor for use in all future airborne and weapons systems. MIL-STD-1750 was referred to as an instruction set architecture (ISA) because, in addition to specifying architectural features of a microprocessor such as the types and number of addressable internal registers, it also precisely documented a set of programming instructions to by executed on the conceptual microprocessor. Thus, with the architectural standard already developed by the military, manufacturers were free to design conforming microprocessors that implemented the '1750 architecture using design and manufacturing techniques that optimized their products toward certain desirable features. For instance, one manufacturer could implement the '1750 architecture in such a manner as to maximize the speed of a '1750 microprocessor. Another manufacturer could optimize their product to maximize its resistance to electromagnetic radiation signals. Yet another manufacturer could tailor their product to minimize the cost of the product. And regardless of which features were emphasized by a particular design implementation, each of the '1750 microprocessor implementations were capable of executing application programs that were coded according to the '1750 ISA.

This trend exploded into the commercial marketplace during the 1980's as desktop computers began to proliferate into the business community. As particular application programs gained in popularity, users began to challenge the industry to provide improved and more technologically advanced microprocessors that were still capable of executing these popular software applications. Consequently, microprocessor designers have since focused on providing faster, more robust, more reliable, more power-efficient, and less costly microprocessor designs that are capable of executing both new software and legacy applications. Within the desktop computer industry today, perhaps the most widely used ISA is the Intel® 32-bit ISA. The 32-bit ISA, or x86 ISA, documents hundreds of programming instructions that can be used in a wide variety of addressing forms for processing data within a present day desktop computer. Today, many different manufacturers produce x86-compatible microprocessors. And the design of each of these x86-compatible microprocessors, as was the case for '1750 microprocessors, is tailored to underscore particular features such as complexity, power, speed, or cost.

To implement a physical microprocessor that conforms to a particular ISA, designers today employ a number of techniques, all of which are utterly transparent to an application programmer. Whereas the application programmer is concerned that a conforming microprocessor provides the documented types and number of internal registers, and that the microprocessor is capable of executing ISA instructions according to specification, he/she is generally not aware of how such conforming capabilities are provided. The hardware and internal logic devices documented within an ISA that must be made available for application programming are generally referred to as "architectural resources." Hardware and logic provided within a microprocessor design to implement these architectural resources in a manner that favors some particular aspect of the design are often called "native resources." For example, the x86 ISA documents eight architectural internal registers that can be explicitly prescribed by x86 macro instructions. Yet, one skilled in the art will appreciate that a present day x86-compatible microprocessor has hundreds of native registers that are used for a wide variety of purposes. But although the use of native resources in a present day microprocessor is prolific, the exercise of these native resources and the manner in which they are prescribed for use is not typically observable to an application programmer nor can he/she explicitly prescribe their use within an application program. This is because his/her applications are coded using macro instructions according to a particular ISA and the macro instructions do not provide for addressing or employing native registers and other resources.

Consequently, a present day microprocessor executes programs from memory that are coded using macro instructions according to a particular ISA. These macro instructions direct the use of various architectural resources, functions, and features within the microprocessor. But within a few clock cycles of fetching a macro instruction from memory, today's microprocessors translate the macro instruction into a corresponding sequence of native instructions. Native instructions are designed to efficiently and effectively utilize the native resources within the microprocessor to carry out the architectural operations prescribed by the macro instruction. For instance, a macro instruction prescribing a swap of the contents of two architectural registers may be translated into a sequence of three native instructions: a first native instruction that retrieves the contents of a first architectural register and that stores the contents into a native register, a second native instruction that moves the contents of a second architectural register to the first architectural register, and a third native instruction that moves the contents of the native register to the second architectural register.

But whereas functions for exercising architectural resources within a present day microprocessor can be programmed and executed using macro instructions, the same cannot be said for the exercise of native resources. And from the standpoint of a production test engineer or an application programmer, the distinction between native resources and architectural resources in a microprocessor design is somewhat artificial at best: a register is a register after all. In the case of an application programmer, the difference between an architectural register and a native register is that the architectural register can be explicitly prescribed for use by an application program; the native register cannot be explicitly prescribed. And from the perspective of a test engineer, if a register exhibits a failure mode, the microprocessor part must be tagged as a failed part, regardless of whether the register is native or architectural.

Yet, outside of a very small amount of native built in self test (BIST) that is manufactured as an element of a microprocessor, all other application and test programs must be developed using macro instructions because today's microprocessors are only capable of executing programs from memory that are written in macro code. Consequently, any application program or native resource test program must indirectly prescribe native resources through the use of complex and sometimes unintelligible macro code sequences. As a result of the complexity surrounding the development of native resource test programs, an alarming number of deficiencies are resulting following mass distribution of some well-known microprocessor designs, primarily because comprehensive and understandable native resource test programs could not be developed to diagnose anomalies in these designs after they were committed to production. In addition, application programmers are precluded altogether from exercising desirable native resources.

The native architecture of certain microprocessor designs is becoming more well known to those in the art as well as the structure of native instructions that are employed internally to efficiently and expeditiously exercise the native architecture to perform certain functions or to execute certain algorithms.

Therefore, what is needed is a microprocessor whose native resources can be exercised at the application programming level via routines consisting of sequences of native instructions.

It is also desirable that the exercise of these native routines be compatible with the concurrent execution of legacy multi-tasking operating system and application software to include provisions for operating in the presence of interrupts, exceptions, task switches, and other forms of program control transfer to which present day applications are exposed.

Furthermore, what is needed is a microprocessor apparatus that allows native instructions, retrieved from memory, to bypass macro instruction translation functions, thereby allowing the explicit prescription of native resources by an application program.

SUMMARY OF THE INVENTION

The present invention, among other applications, is directed to solving these and other problems and disadvantages of the prior art The present invention provides a superior technique for providing application programs with the ability to embed native instruction sequences for execution by a microprocessor. In one embodiment, an apparatus is provided in a microprocessor for executing native instructions that are provided directly to the microprocessor via an external instruction bus. The apparatus includes instruction translation logic and bypass logic. The instruction translation logic retrieves macro instructions provided via the external instruction bus, and translates each of the macro instructions into associated native instructions for execution. If a first form of a first macro instruction is retrieved, the instruction translation logic directs the microprocessor to enable a native bypass mode and indicates such by asserting a first bit within a control register. The bypass logic is coupled to the instruction translation logic. The bypass logic accesses the first bit within the control register to determine if the native bypass mode has been enabled, and detects wrapper macro instructions and, upon detection of the wrapper macro instructions, disables the instruction translation logic, and provides the native instructions for execution by the microprocessor, thereby bypassing said instruction translation logic. The wrapper macro instructions are existing macro instructions which are translated by the instruction translation logic according to architectural specifications if the native bypass mode has not been enabled.

One aspect of the present invention contemplates an apparatus, for allowing a micro instruction to be directly provided from an external instruction bus to execution logic within a pipeline microprocessor. The apparatus has a translator and bypass logic. The translator receives macro instructions from a macro instruction bus, and translates each of the macro instructions into associated micro instructions, the associated micro instructions being provided to the execution logic via a micro instruction bus. The bypass logic is coupled to the translator, and routes the micro instruction to the execution logic. The bypass logic includes a mode detector and native instruction routing logic. The mode detector detects a native bypass mode, and detects a wrapper macro instruction, and directs that the translator cease instruction translation, where the wrapper macro instruction is an existing macro instructions which would otherwise be translated by the translation logic according to architectural specifications if the native bypass mode is not enabled. The native instruction routing logic is coupled to the mode detector. The native instruction routing logic receives the wrapper macro instruction from the macro instruction bus, and provides the micro instruction to the micro instruction bus, thereby circumventing the translator.

Another aspect of the present invention comprehends a method for providing a plurality of native instructions stored in a memory directly to a microprocessor for execution. The method includes enabling a native instruction bypass mode within the microprocessor; embedding the plurality of native instructions within a corresponding plurality of wrapper instructions and providing the corresponding plurality of wrapper instructions to the microprocessor, where the corresponding plurality of wrapper instructions are existing macro instructions, and where the corresponding plurality of wrapper instructions would otherwise be translated by instruction translation logic according to architectural specifications in the absence of the enabling; and within the microprocessor, detecting the native instruction bypass mode and extracting the plurality of native instructions from within the corresponding plurality of wrapper instructions.

BRIEF DESCRIPTION OF THE DRAWINGS

These and other objects, features, and advantages of the present invention will become better understood with regard to the following description, and accompanying drawings where:

FIG. 6 is a timing diagram illustrating how a sample native instruction sequence is employed to directly prescribe tests for a particular native register within the microprocessor according to the present invention;

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

In view of the above background on how a present day microprocessor is composed of both architectural resources and native resources, several related art examples will now be discussed with reference to FIGS. 1 and 2. These examples illustrate the problems associated with developing comprehensive and straightforward programs for exercising and testing both kinds of resources. From a testing perspective, after a microprocessor is in production, designing straightforward programs to test native resources is especially difficult, because these programs must be coded using macro instructions that are not capable of directly specifying native resources. From an application programming perspective, algorithms cannot be developed to efficiently and expeditiously employ native resources because these resources are not visible at the macro instruction level. Following the related art discussion, a detailed description of the present invention will be provided with reference to FIGS. 3 through 8. The present invention overcomes the limitations of present day microprocessors by providing means whereby native instruction programs can be directly executed from memory, consequently enabling a programmer to explicitly prescribe and employ native resources.

Figure 1:
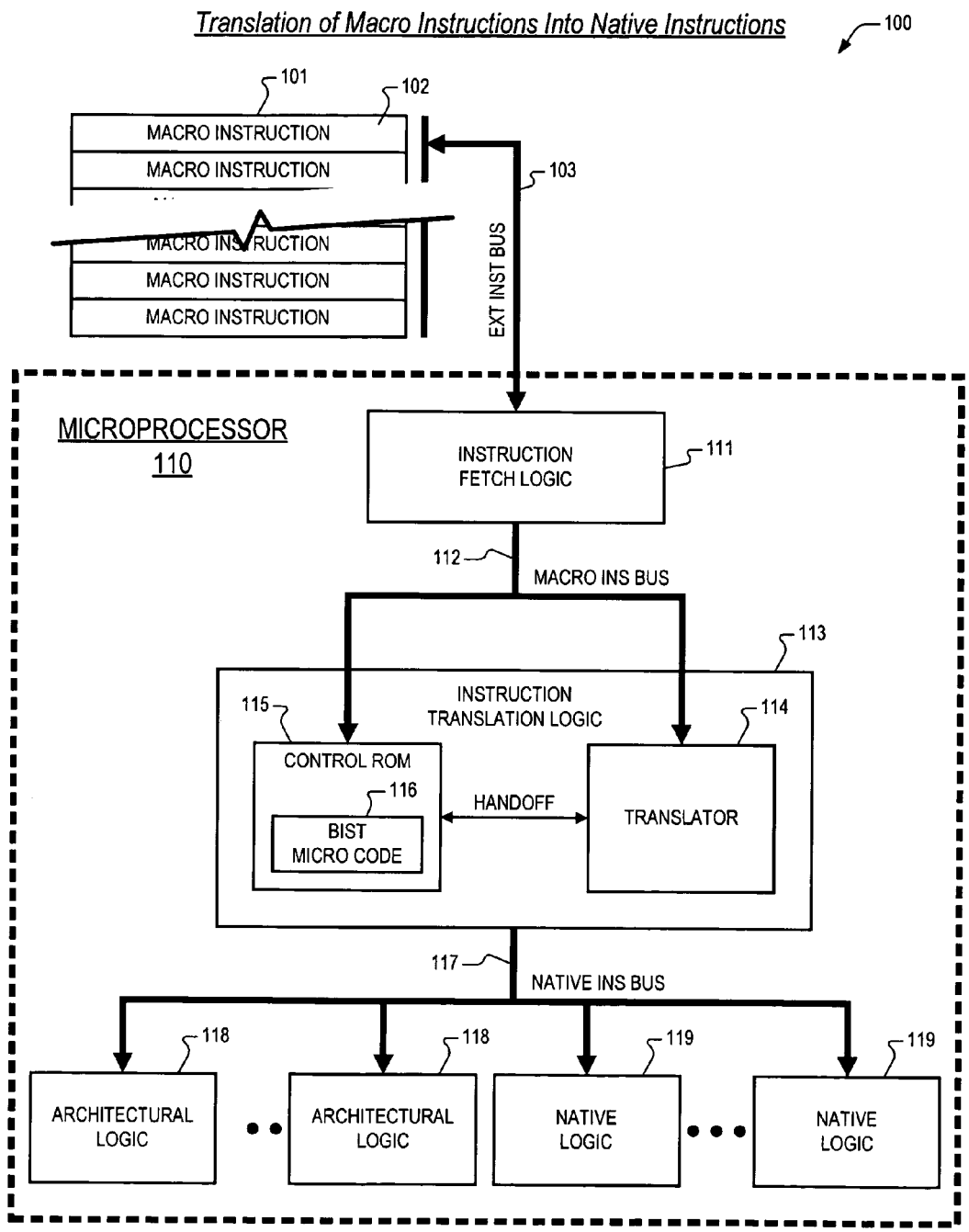
FIG. 1 is a block diagram of a related art microprocessor illustrating the distinctions between architectural resources and native resources within the microprocessor.

Now referring to FIG. 1, a block diagram 100 is presented of a related art microprocessor 110 illustrating the distinctions between architectural resources 118 and native resources 119 within the microprocessor 110. The block diagram 100 depicts a memory 101 from which the microprocessor 110 fetches macro instructions. The macro instructions are, contained in specific locations 102, or addresses 102, within the memory 101 and are provided to the microprocessor 110 via an instruction bus 103.

The microprocessor 110 includes instruction fetch logic 111 that is coupled to a macro instruction bus 112. Fetched macro instructions are provided over the macro instruction bus 112 to instruction translation logic 113. The instruction translation logic 113 within a present day microprocessor 110 generally comprises both a translator 114 and a control read-only memory (ROM) 115. In addition, a small portion of the control ROM 115 typically contains built in self test (BIST) native instructions 116. Responsive to macro instructions, the instruction translation logic 113 issues native instructions over a native instruction bus 117 to both architectural resources 118 and native resources 119 within the microprocessor 110. Native instructions are also referred to as native code, micro instructions, or micro code.

Application programs that execute on the microprocessor 110 are coded using macro instructions. Macro instructions are those programming instructions that conform to a particular instruction set architecture (ISA). An instruction set architecture documents the high-level design, i.e., the architectural resources 118, within a conceptual microprocessor. The ISA also documents a set of macro instructions that are to be used to exercise these resources 118. Architectural resources 118 typically specified in an ISA include features of the conceptual microprocessor (e.g., pipelining, parallelism, and compiler interaction), functions that the conceptual microprocessor must provide (e.g., arithmetic operations, string operations), the application programming environment for the conceptual microprocessor (e.g., 32-bit operands, application protection mechanisms), the execution environment (e.g., types and number of general purpose and special purpose registers, and how memory is modeled), and the instruction set reference itself. The instruction set reference specifies, in detail, the macro instructions that conform to the ISA, their format, and how they are to operate on the conceptual microprocessor. Perhaps the most widely recognized ISA within the desktop computer industry is the Intel® 32-bit ISA, more commonly referred to as the x86 ISA. The x86 ISA applies to any microprocessor that is represented as an x86-compatible microprocessor.

In contrast however to conceptual microprocessors, microprocessor designers endeavor to develop and produce physical microprocessor embodiments that exploit one or more profitable aspects of the marketplace. To illustrate this point, note that there have been many different physical microprocessor embodiments produced over the years that conform to the x86 ISA. And these microprocessors are manufactured by different companies. Yet notwithstanding the differences between the microprocessor embodiments, one skilled in the art will appreciate that each of the microprocessors that conform to the x86 ISA is capable of executing programs that are coded using macro instructions from the x86 ISA. Adherence to a particular ISA enables a microprocessor manufacturer to develop and produce improved microprocessor embodiments that can execute legacy application software, thus allowing the manufacturer to preserve a market segment while at the same time permitting the exploitation of technological advances in the art.

The controls that an ISA holds over a particular microprocessor embodiment 110, however, extend only to those features, functions, and resources that are observable through the execution of macro instructions conforming to the ISA. Accordingly, a microprocessor 110 in compliance with the particular ISA must implement those features, functions, and resources. But exactly how those features, functions, and resources are implemented is not controlled by the ISA. Consequently, different microprocessor embodiments, each complying with a specific ISA, can vary significantly with regard to how the specific ISA is implemented. For example, one microprocessor might implement the specific ISA in a manner such that power is conserved. Another microprocessor might implement the specific ISA so that throughput is maximized. Yet another microprocessor might implement the specific ISA so as to minimize complexity or cost.

A given microprocessor 110 typically implements an ISA by providing a number of native resources 119, in addition to the architectural resources 118 specified by the ISA, where the native resources 119 are employed to realize the ISA in such a way that certain desirable attributes of the given microprocessor 110 are emphasized and other undesirable characteristics are suppressed. For instance, although the x86 ISA prescribes only eight architectural registers that can be exercised via the execution of x86 macro instructions, most present day x86-compatible microprocessors 110 are known to have over 100 native registers 119. These native registers 119 are used to achieve a wide variety of ends, all of which are presently transparent to an application software programmer. The employment of these native registers 119 and other native resources 119 within a given microprocessor embodiment 110 is directed through the use of unique native instructions. These native instructions are designed to directly and efficiently exercise the native resources 119 within the given microprocessor embodiment 110 to achieve an optimized implementation of a specific ISA.

Accordingly, in operation, the instruction fetch logic 111 retrieves the macro instructions 102 from the memory 103. The macro instructions 102 are sequentially provided to the instruction translation logic 113 over the macro instruction bus 112. The instruction translation logic 113 translates each of the provided macro instructions and generates one or more corresponding native instructions whose execution accomplishes prescribed architectural operations using prescribed architectural resources 118. To accomplish an architectural operation, native instructions will very often command the use of several native resources 119 to perform certain sub-operations. Native instructions are provided to the execution logic 118, 119 in the microprocessor 110 via the native instruction bus 117.

To summarize the above discussion, macro instructions 102 are fetched from memory 101. But following their retrieval the macro instructions 102 are translated into corresponding native instructions. It is the native instructions that are executed by the execution logic 118, 119 within the microprocessor 110.

As noted above, present day instruction translation logic 113 utilizes both a translator 114 and a control ROM 115 to translate fetched macro instructions into corresponding native instruction sequences. For example, one particular macro instruction may be more easily detected and manipulated by the translator 114 to effect translation into a corresponding particular native instruction sequence. In contrast, a native instruction sequence implementing the operations prescribed by a different macro instruction may be more effectively provided by merely storing the native sequence within the control ROM 115 and retrieving the sequence when the different macro instruction is received over the macro instruction bus 112. The translator 114 and the control ROM 115 work together by coordinating the translation of macro instructions via a handoff signal HANDOFF. Typically, the translator 114 initiates a handoff. It is beyond the scope of this application to provide an in-depth discussion of the techniques and apparatus that are employed within a present day microprocessor 110 to efficiently translate macro instructions into micro instructions. It is sufficient herein to appreciate that a typical microprocessor 110 employs both a translator 114 and a control ROM 115.

The BIST micro code 116 is a sequence of micro instructions that is automatically issued to the native instruction bus 117 upon initialization (e.g. power-up or reset) of the microprocessor 110. The BIST micro code 116 is designed to test both architectural resources 118 and native resources 119 within the microprocessor 110. The BIST code 116 is developed prior to the production of the microprocessor 110 and is thus burned into the control ROM 115 each time a microprocessor chip 110 is manufactured; BIST code 116 cannot be modified without modifying the microprocessor design. And with regard to initialization testing, from the standpoint of the microprocessor 110, there is in fact no real distinction between the testing of architectural resources 118 and native resources 119, for a failure of either of these resources 118, 119 will most likely result in a malfunction of the microprocessor 110.

With regard to testing, there remain two important differences between architectural resources 118 and native resources 119 that severely hamper testing of the microprocessor 110 after its design has been committed to production. First, the amount of the BIST micro code 116 that is burned into the control ROM 115 is more often than not only the minimum number of native instructions that are required to flag a catastrophically failed part 110. This is because real-estate within a present day microprocessor 110 for logic circuits comes at a premium. And as is typically the case, circuit area is allocated to logic that implements essential and primary functions. Area for the implementation of ancillary functions such as BIST is allocated at a lower priority level. Consequently, BIST micro code 116 almost never provides for comprehensive diagnostic testing of native resources 119; the tests burned into the ROM 115 only enable a tester to make high-level GO/NO-GO decisions about the part 110.

The second important difference between testing architectural resources 118 and native resources 119 lies in the fact that once a microprocessor design 110 is committed to production, the only manner in which supplemental testing of native resources 119 can be achieved is by developing test programs using macro instructions. And macro code does not allow a programmer to specify a native resource 119 for testing. Hence, to test a specific native resource 119, a sequence of macro instructions must be generated that indirectly utilizes that specific native resource 119 to achieve some directly specified architectural operation. In light of the inability to explicitly specify native resources 119 within macro instructions, it is an understatement to say that diagnostic and other application programs today are exceedingly difficult to develop and perhaps more difficult to understand. An example of how native resources 119 are employed within the microprocessor 110 to perform an architecturally-prescribed operation is more specifically discussed with reference to FIG. 2.

Figure 2:
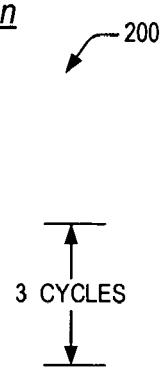
FIG. 2 is a timing diagram illustrating how a native register within the microprocessor of FIG. 1 is exercised indirectly through execution of a macro instruction.

Referring to FIG. 2, a timing diagram 200 is presented illustrating how a native register 119 within the microprocessor 110 of FIG. 1 is exercised indirectly through execution of a macro instruction. The timing diagram 200 depicts two columns related to the flow of instructions through the microprocessor 110: a column entitled "Macro Ins Bus" and a column entitled "Native Ins Bus." The Macro Ins Bus column depicts macro instructions that have been retrieved from memory 101 by the fetch logic 111 and which are provided to the instruction translation logic 113 over the macro instruction bus 112. The Native Ins Bus column shows the resulting native instructions that are generated by the instruction translation logic 113 and which are provided to the native instruction bus 117. Flow of the instructions is depicted with respect to cycles of a microprocessor clock signal. Non-relevant instructions before and after instructions of interest are designated by the marks "***".

During cycle 1, an addition macro instruction, designated ADD [EAX], FFFFFFFFh, is provided to the instruction translation logic 113 over the macro instruction bus 112. More specifically, the addition macro instruction has a macro opcode, ADD, that directs the microprocessor 110 to execute an architectural function, addition of two operands. A first operand is contained within a location in data memory (not shown) whose address is prescribed by the contents of an architectural register 118, EAX. A second operand, FFFFFFFFh, is provided within an immediate field of the addition macro instruction. The macro opcode also directs the microprocessor 110 to store the sum of the two operands in the memory location from which the first operand is retrieved.

Although the addition macro instruction prescribes a very straightforward operation involving the two operands, the implementation of this operation by the microprocessor 110 requires the execution of three specific sub-operations. First, the first operand must be retrieved from data memory. Next, the sum of the two operands must be generated. Finally, the sum must be stored back to the location in data memory.

Accordingly, during cycle 2, the instruction translation logic 113 provides a first native instruction, designated LD NR1, [EAX]. More specifically, a native opcode, LD, directs the microprocessor 110 to perform a native function, a load of the first operand from data memory. The address of the first operand is prescribed within an architectural register 118, EAX. But to make the first operand available for the addition operation, the first micro instruction directs that the first operand be placed in a native register 119, designated NR1.

During cycle 3, the instruction translation logic 113 issues a second native instruction, designated ADD NR1, NR1, FFFFFFFFh, over the native instruction bus 117. More specifically, a native opcode, ADD, commands the microprocessor 110 to sum the contents of the native register 119, NR1, with an immediate operand, FFFFFFFFh. In addition, the second micro instruction directs that the sum be written back to the native register 119, NR1.

During cycle 3, a third native instruction, designated ST [EAX], NR1, is issued over the native instruction bus 117 to the execution logic 118, 119. The third native instruction directs the microprocessor 110 to perform a native store operation to store the contents of the native register 119, NR1, to the location in memory prescribed by the contents of the architectural register 118, EAX.

Three cycles of the clock are required to execute the native instructions that are generated by the instruction translation logic 113 to accomplish the architectural operation prescribed by the addition macro instruction. This one-to-many mapping of macro instructions to corresponding native instructions is common, for most macro instructions required that several native instructions be generated to accomplish their prescribed operation. In fact, the translation of some macro instructions requires the generation of hundreds of micro instructions.

In addition, it is noted that the native register 119, NR1, is used only as temporary storage for the first operand and for the sum. And although native registers 119 within a present day microprocessor 110 are typically used for such purposes, an application programmer is never alerted when a native register 119 is employed because he/she observes the execution of a program at the macro instruction level. Nor is the programmer capable of prescribing use of that particular register for the purposes of expediting the execution of some given algorithm.

From a testing point of view, however, to be comprehensive, it is essential to exercise all of the logic resources within the microprocessor 110, both architectural resources 118 and native resources 119. Yet as the example of FIG. 2 so illustrates, the only means for effecting a test on a native register 119, after the microprocessor has been committed to production, is through the use of macro instructions. And as has been noted earlier, macro instructions do not provide for the explicit specification of native resources 119. Consequently, the generation of diagnostic programs to test native resources 119 within a microprocessor 110 typically requires a great deal of skill: knowledge about how and when specific native resources 119 are employed to accomplish certain architectural functions, and the skill to write macro code sequences-often complex sequences-to establish the conditions whereby the functions of a given native resource 119 can be isolated and exercised.

As a result, native resource test programs today often seem complex and mysterious to the uninformed. And because of the complexity surrounding the development of native resource tests through the use of macro instructions, these test programs are frequently fraught with error. One skilled in the art will appreciate that the development of native resource test programs is a problem that continues to plague the industry.

From an application programming perspective, one skilled in the art will appreciate that numerous benefits (e.g., execution speed, memory efficiency) would result from providing the capability to prescribe and employ native resources of a particular microprocessor as part of an application program.

The present invention overcomes the problems noted above by providing a microprocessor that is capable of executing native instructions directly from memory. As a result, straightforward and understandable test programs can be developed, after a design has been committed to production, to comprehensively test native resources. This is because these native resources can be explicitly prescribed via native instructions within a test program. In addition, application programs can be developed that exploit particular native resources within a microprocessor design to achieve processing or other benefits beyond those provided for by a given system architecture. The present invention will now be discussed with reference to FIGS. 3 through 8.

Figure 3:
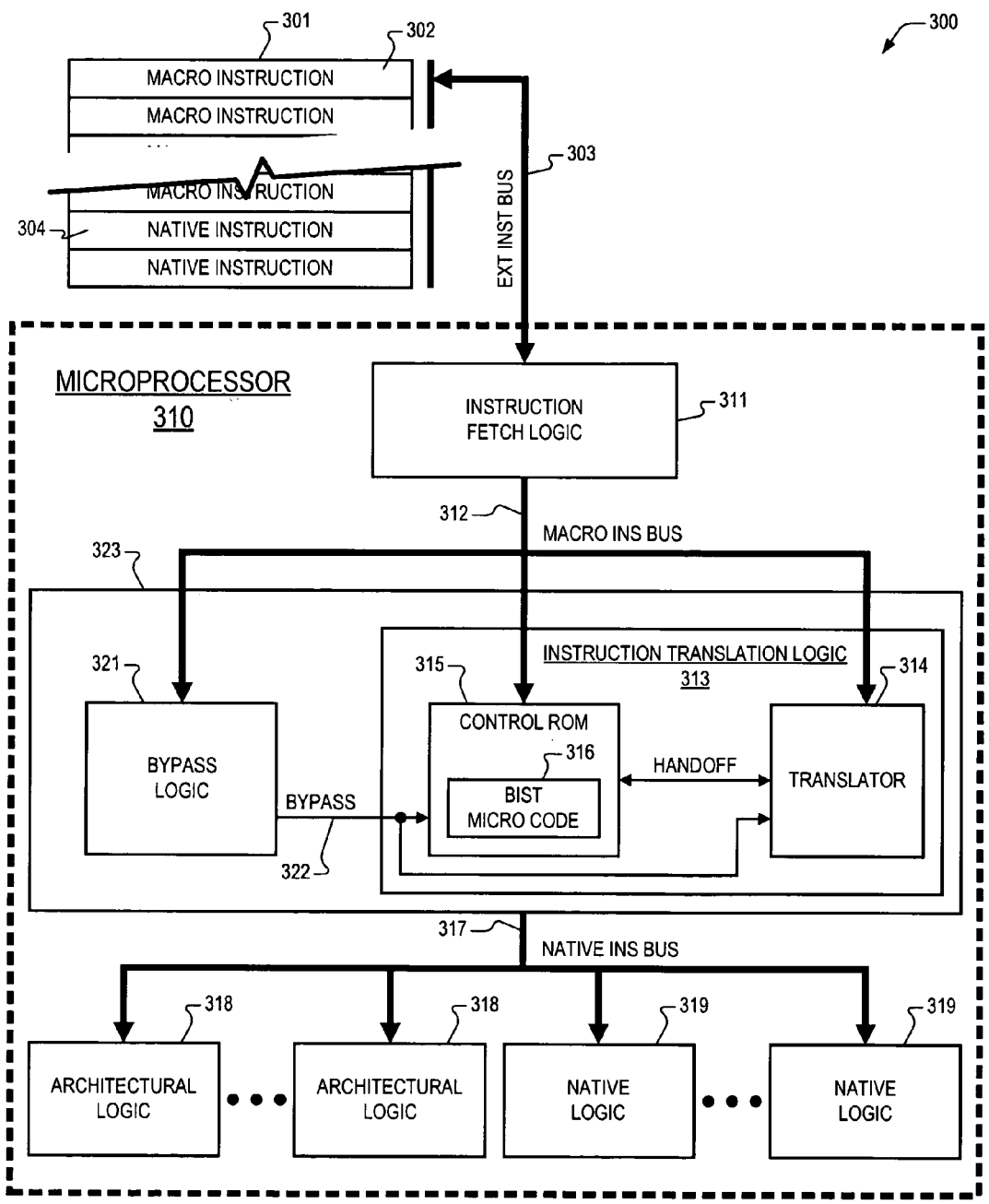
FIG. 3 is a block diagram of a microprocessor according to the present invention that is capable of executing native instructions directly from memory.

Referring to FIG. 3, a block diagram 300 is presented of a microprocessor 310 according to the present invention that is capable of executing native instructions 304 directly from memory 301. The block diagram 300 depicts the memory 301 from which the microprocessor 310 fetches macro instructions 302. The macro instructions 302 are provided to the microprocessor 310 via an external instruction bus 303. And in contrast to a present day microprocessor, the microprocessor 310 according to the present invention is also capable of retrieving native instructions 304 from the memory 301 via the external instruction bus 303.

The microprocessor 310 includes instruction fetch logic 311 that provides an output to a macro instruction bus 312. The instruction fetch logic 310 is logic, circuits, devices, or microcode (i.e., micro instructions or native instructions), or a combination of logic, circuits, devices, or microcode, or equivalent elements that are employed to fetch instructions 302, 304 from memory 302. The elements employed to fetch instructions 302, 304 in the instruction fetch logic 311 may be shared with other circuits, microcode, etc., that are employed to perform other functions. Fetched macro instructions and fetched native instructions are provided over the macro instruction bus 312 to translate stage logic 323. The translate stage logic 323 includes logic, circuits, devices, or microcode (i.e., micro instructions or native instructions), or a combination of logic, circuits, devices, or microcode, or equivalent elements that are employed to translate the fetched instructions 302, 304. The elements employed to translate instructions 302, 304 in the translation stage logic 323 may be shared with other circuits, microcode, etc., that are employed to perform other functions. Within the translate stage logic 323, instructions are distributed to instruction translation logic 313 and bypass logic 321. The bypass logic 321 is coupled to the instruction translation logic 313 via a bypass signal group 322, BYPASS. The instruction translation logic 313 includes a translator 314 and a control ROM 315. In addition, a small portion of the control ROM 315 contains built in self test (BIST) native instructions 316. The translate stage logic 323 issues native instructions over a native instruction bus 317 to both architectural resources 318 and native resources 319 within the microprocessor 310.

The microprocessor 310 according to the present invention is structurally similar to a present day microprocessor in that it implements an ISA by providing a number of native resources 319, in addition to those architectural resources 318 specified by the ISA, where the native resources 319 are employed to realize the ISA in such a way that certain desirable attributes of the given microprocessor design 310 are emphasized. But in addition to providing these native resources 319, the microprocessor 310 according to the present invention provides bypass logic 321 within the translate stage 323. The purpose of the bypass logic 321 is to route native instructions 304 retrieved from the memory 301 from the macro instruction bus 312 to the native instruction bus 317, thereby circumventing the function performed by the instruction translation logic 313.

During normal execution of an application program, the instruction fetch logic 311 retrieves the macro instructions 302 from the memory 303. The retrieved macro instructions are sequentially provided to the translate stage logic 323 over the macro instruction bus 312. The instruction translation logic 313 translates each of the macro instructions and generates one or more corresponding native instructions whose execution accomplishes prescribed architectural operations using prescribed architectural resources 318. And similar to the operation of a conventional microprocessor, within the microprocessor 310 according to the present invention native instructions will often utilize native resources 319 to perform certain sub-operations. The native instructions are thus provided to the execution logic 318, 319 in the microprocessor 310 via the native instruction bus 317. Hence, in a normal operating mode, macro instructions 302 are fetched from memory 301. The macro instructions 302 are decoded into corresponding native instructions. And the native instructions are executed by the execution logic 318, 319.

The translator 314 and the control ROM 315 within the microprocessor 310 coordinate the translation of macro instructions 302 through use of a handoff signal, HANDOFF. In addition, the BIST micro code 316 within the control ROM 315 is automatically issued to the native instruction bus 317 upon initialization of the microprocessor 310. The BIST micro code 316 executes tests on both architectural resources 318 and native resources 319 within the microprocessor 110. The BIST code 316 is developed prior to the production of the microprocessor 310 and is burned into the control ROM 315 each time a microprocessor chip 310 is manufactured; BIST code 316 cannot be modified without altering the design of the microprocessor 310.

But operation of the microprocessor 310 according to the present invention, however, is not restricted to the conduct of high-level native resource tests via BIST. This is because, in addition to being able to execute the BIST micro code 316, execution of a special macro instruction, a native bypass macro instruction, places the microprocessor 310 into a native bypass mode whereby native instructions 304 are fetched from memory 301 and routed around the instruction translation logic 313 directly to the native instruction bus 317 for execution by the execution logic 318, 319. This is a powerful feature for diagnostic testing or application programming because this added capability allows the development of programs that are coded in native micro code. Follow-on test programs and diagnostic tools can now be developed that explicitly specify native resources 319 in contrast to the indirect specification that has been heretofore required. In addition, application programs can now be developed that exploit certain powerful native resources in a given microprocessor design.

When a native bypass macro instruction is executed, the bypass logic 321 disables the control ROM 315 and the translator 314 via the BYPASS signal group 322. At this point, program control is transferred to a part of memory 301 containing a sequence of native instructions 304. The instruction fetch logic 311 fetches the native instructions 304 over the external instruction bus 303 and sequentially provides them to the macro instruction bus 312. While the instruction translation logic 313 is disabled, the bypass logic 321 routes the fetched micro instructions directly to the native bus 317. At this point in the operational pipeline, since native instructions are normally executed by the architectural logic 318 and native logic 319, operation of the microprocessor 310 according to the present invention would appear in every way to be equivalent to that of a present day microprocessor. Yet, in bypass mode, the microprocessor 310 is executing native instructions 304 directly from memory 301. And these sequences of native instructions can be developed and modified, after the microprocessor 310 is placed in production.

In addition to providing the flexibility to execute micro code 304 directly from memory 301, the present invention enables microprocessor production test engineers and application programmers to develop straightforward and understandable test code. No longer are complex and obscure sequences of macro instructions required to test specific native logic devices 319; the native logic 319 can be explicitly specified by native instructions 304 that are provided to the microprocessor 310 over the external instruction bus 303.

Another special bypass macro instruction, a native bypass return macro instruction, directs the microprocessor 310 to return program control to a specified memory location containing macro code. When the native bypass return macro instruction is detected at the end of a native instruction sequence, the bypass logic 321 enables normal operation of the instruction translation logic 313 via the bypass signal group 322. When normal operation is enabled, the instruction translation logic 313 resumes decoding macro instructions retrieved from the specified memory location.

Figure 4:
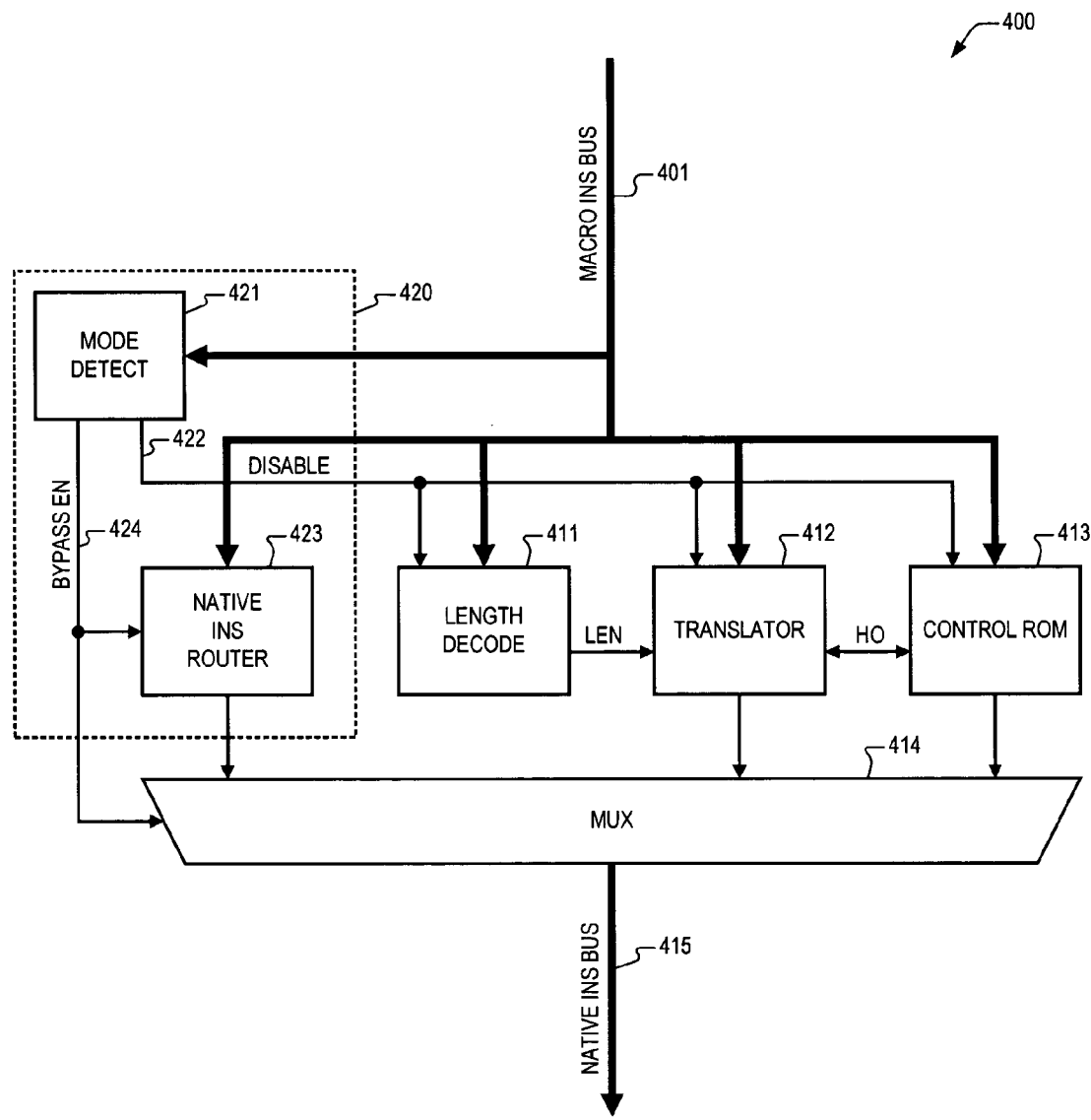
FIG. 4 is a block diagram illustrating translate stage logic within the microprocessor of FIG. 3.

Now referring to FIG. 4, a block diagram 400 is presented illustrating translate stage logic within the microprocessor of FIG. 3. The block diagram 400 shows a macro instruction bus 401 that distributes instructions fetched from memory (not shown) to bypass logic 420, an instruction length decoder 411, a translator 412, and a control ROM 413. Within the bypass logic 420, instructions are provided to mode detection logic 421 and native instruction routing logic 423. The mode detector 421 provides two signals comprising a bypass signal group, BYPASS EN 424 and DISABLE 422. DISABLE 422 is routed to the length decoder 411, the translator 412, and the control ROM 413. BYPASS EN 424 is provided as a control signal to a mux 414. Native instruction outputs from the native instruction router 423, the translator 412, and the control ROM 413 are provided to the mux 414. The mux 414 outputs native instructions to a native instruction bus 415.

In a normal operating mode, macro instructions from an application program are provided over the macro instruction bus 401. Because macro instructions typically do not conform to a fixed length standard, the length decoder 411 evaluates the byte stream over the bus 401 to determine the length in bytes of each macro instruction. The length in bytes of each macro instruction is provided to the translator 412 via a length signal, LEN. The translator 412 accordingly retrieves the number of indicated bytes from the macro instruction bus 401. If a retrieved macro instruction is to be decoded by the translator 412, then the translator 412 performs the translation of the macro instruction into associated native instructions. The native instructions are then provided from the translator 412 to the mux 414. If the retrieved macro instruction is to be decoded by the control ROM 413, then the translator 412 directs the control ROM to performs the translation of the macro instruction into associated native instructions via a handoff signal HO. In this case native instructions are output for execution from the control ROM 413 to the mux 414.

During normal operation, the mode detector 421 monitors the instructions appearing over the bus 401 to detect a bypass macro instructions. If a native bypass macro instruction is detected, then the mode detector 421 asserts both DISABLE 422 and BYPASS EN 424. In one embodiment, DISABLE 422 inhibits the length decoder 411, the translator 412, and the control ROM 413 from performing instruction translation functions for instruction bytes following the native bypass macro instruction. BYPASS EN 424 enables the routing of native instructions by the native instruction router 423 via the mux 414 for instructions following the native bypass macro instruction.

The translator 412 decodes a native bypass macro instruction into an unconditional jump native instruction directing that program control be transferred to a memory address containing a native instruction sequence. In one embodiment, the memory address is prescribed by the contents of an architectural register (not shown). In an x86-compatible embodiment, the memory address is prescribed by the contents of register EAX (not shown). Hence, upon translation of a native bypass macro instruction, the unconditional jump native instruction is provided to execution logic (not shown) via the native instruction bus 415. As the unconditional jump native is executed, the target memory address is provided to fetch logic (not shown). The fetch logic thus transfers program control to the target memory address containing a sequence of native instructions.

While in bypass mode, the native instruction router 423 retrieves native instructions from the bus 401 and outputs these natives to the mux 414. BYPASS EN 424 directs the mux 414 to select the native instruction router output stream for transmission to the native instruction bus 415. In one embodiment, all native instructions are of a fixed number of bytes. In a specific embodiment, native instructions are four bytes long.

During the cycles where native instructions are being executed by the microprocessor 310, thereby circumventing instruction translation, the mode detection logic 421 continues to evaluate the incoming byte stream to detect a native bypass return macro instruction, thus directing the microprocessor to return to normal operating mode. When a native bypass return macro instruction is detected, the mode detector 421 indicates the end of bypass operation by terminating DISABLE 422 and BYPASS EN 424. Hence, instruction translation is resumed and program control is transferred to a return memory address containing a macro instruction for execution by the microprocessor 310. In one embodiment, the return memory address is the address of a macro instruction following the native bypass macro instruction. In an alternative embodiment, the return memory address is prescribed in an architectural register.

Figure 5:
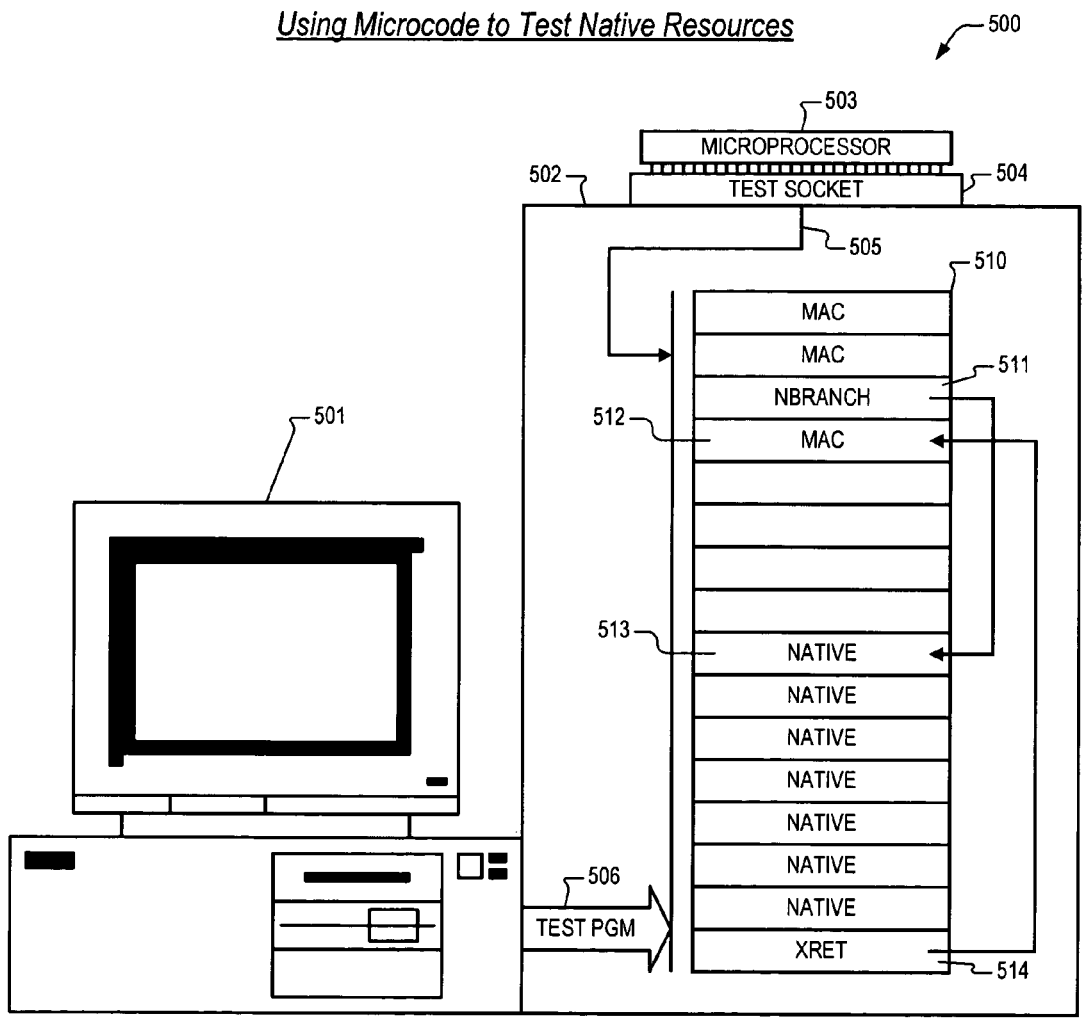
FIG. 5 is a block diagram illustrating how programs consisting of native instructions are used to directly exercise native resources within the microprocessor according to the present invention.

Now referring to FIG. 5, a block diagram 500 is presented illustrating how programs consisting of native instructions are used to directly exercise native resources within the microprocessor 503 according to the present invention. The block diagram 500 shows an automated microprocessor tester 501 that is coupled to a test adapter 502. The test adapter 502 provides a test socket 504 for testing a microprocessor 503 according to the present invention. An external memory bus 505 allows the microprocessor 503 to access test programs from a test memory 510. For specific tests, the contents of the memory 510 are loaded by the automated tester 501 via a test program bus 506.

For testing, the a microprocessor sample 503 is connected to the test socket 504. Via the test socket 504, the test adapter 502 provides all of the signals (not shown) that the microprocessor 503 requires for operation. In addition, all of the microprocessor signals are monitored by the test adapter 502 during each of the tests for proper functionality. Typically, under control of the automated tester 501, individual test programs are downloaded into test memory 510 via the test program bus 506. Following download of an individual test program into the test memory 510, the microprocessor under test 503 is directed to fetch and execute the instructions in memory 510 to exercise particular architectural and native resources within. And heretofore, these individual test programs were written using macro code sequences that could not explicitly prescribe native resources. But according to the present invention, native instruction test program sequences can be now executed directly from memory 510.

The block diagram 500 illustrates the transfer of control from a macro instruction sequence to native test routines and transfer of control back to the macro instruction sequence. As the microprocessor 503 executes code in the macro instruction sequence, it encounters a native bypass macro instruction, NBRANCH, at designated memory location 511. Execution of the NBRANCH instruction results in control transfer to a bypass target memory location 513 containing a first native instruction in a native test sequence. Following execution of the native instructions in the native sequence, the microprocessor 503 detects a native bypass return macro instruction, XRET, at memory location 514. Execution of the XRET instruction transfers program control back to a bypass return address, 512, where the microprocessor 503 resumes the translation of macro instructions into natives.

By providing the capability to enter into a native execution mode, a microprocessor 503 according to the present invention can be exhaustively and comprehensively tested during production using test programs that are direct and less complex than what has heretofore been provided.

Now referring to FIG. 6, a timing diagram 600 is presented illustrating how a sample native instruction sequence is employed to directly prescribe tests for a particular native register 319 within the microprocessor 310 according to the present invention. The timing diagram 600 depicts two columns related to the flow of instructions through the microprocessor 310: a column entitled "Macro Ins Bus" and a column entitled "Native Ins Bus." The Macro Ins Bus column depicts macro instructions that have been retrieved from memory 301 by the fetch logic 311 and which are provided to the instruction translation logic 313 over the macro instruction bus 312. The Native Ins Bus column show the resulting native instructions that are generated by the translate stage logic 323 and which are provided to the native instruction bus 317. Flow of the instructions is depicted with respect to cycles of a microprocessor clock signal. Non-relevant macro instructions before and after instructions of interest are designated by the marks "***". Non-relevant native instructions are designated by the marks "+++".

During cycle 1, a move macro instruction, designated MOV EAX, TST1, is provided over the macro instruction bus 312. More specifically, the move macro instruction has a macro opcode, MOV, that directs the microprocessor 310 to move an immediately supplied memory address, TST1, into architectural register EAX. Since this is an instruction that is encountered during normal operating mode, the instruction translation logic 313 decodes the move macro instruction into a corresponding native load instruction, designated LD EAX, TST1. More specifically, the native load instruction has a native opcode, LD, that directs the microprocessor 310 to load an immediate value, TST1, into architectural register EAX.

During cycle 2, the instruction translation logic 313 provides the native load instruction to the native instruction bus 317, thus directing the microprocessor 310 to store the memory address for a native instruction sequence into architectural register EAX. In addition, during cycle 2, a second move macro instruction, MOV EXB, OUTBFR, is provided over the macro instruction bus 312. The second move macro instruction directs the microprocessor 310 to place the contents of an output buffer memory location, OUTBFR, into architectural register EBX. Since the second move instruction is an instruction that is encountered during normal operating mode, the instruction translation logic 313 decodes the it into a corresponding second native load instruction designated as LD EBX, OUTBFR. More specifically, the native load instruction has a native opcode, LD, that directs the microprocessor 310 to load an immediate value, OUTBFR, into architectural register EBX.

During cycle 3, the instruction translation logic 313 issues the second native load instruction to the native instruction bus 317, thus directing the microprocessor 310 to store the memory address for the output buffer into register EBX. In addition during cycle 3, a native bypass macro instruction, NBRANCH, is provided over the macro instruction bus 312. In one embodiment, NBRANCH directs the microprocessor 310 to branch to the memory location prescribed in register EAX. Accordingly, the bypass logic 321 detects the native bypass macro instruction and directs the microprocessor 310, via the BYPASS signal group 322 to enter a native bypass mode. Consequently, the instruction translation logic 313 decodes NBRANCH into an unconditional jump native instruction, designated as JMP [EAX], directing that program control be transferred to the memory location contained within register EAX. As the jump native instruction is generated, branch prediction logic (not shown) within the translate stage 323 directs instruction fetch logic (not shown) to begin fetching instruction bytes from location TST1.

During cycle 4, the jump native instruction is issued to the micro instruction bus 317. Also during cycle 4, a first native instruction, retrieved from memory location TST1, is provided via the macro instruction bus 312 to the bypass logic 321. The first native instruction, LD T1, 0, directs the microprocessor 310 to load 0 into explicitly specified native register T1. Hence, because instruction translation has been disabled, the bypass logic 321 routes the first native instruction directly to the micro instruction bus 317. The first native instruction thus explicitly prescribes a test for native register T1.

During cycles 5 through 100, native instructions that explicitly and directly specify operations to be performed on native registers 319 are retrieved from memory 301 and routed to the micro instruction bus 317 by the bypass logic 321. For example, a native instruction provided over the macro instruction bus 313 during cycle 5, ST [EBX], T1, directs the microprocessor to output the contents of native register T1 to the output buffer. During cycle 6, native instruction NOT T1 directs the microprocessor 310 to logically complement the contents of T1. And during cycle 7, ST [EBX], T1, directs the microprocessor 310 to output the complemented contents of T1 to the output buffer. Native instructions according to the present invention continue to be executed directly from memory up through cycle 1000.

During cycle 1001, a native branch return macro instruction, XRET, is detected by the bypass logic 321. Accordingly, the bypass logic 321, via the BYPASS signal group 322, directs the instruction translation logic 313 to resume decoding macro instructions from the macro instruction bus 312. Hence, the instruction translation logic 313 decodes XRET into an unconditional jump native instruction, designated as JMP [EAX+1], directing the microprocessor 310 to transfer program control to a macro instruction, NEXT MAC, that follows the bypass macro instruction, NBRANCH, in memory 301. During this cycle, the branch prediction logic directs the instruction fetch logic to begin fetching macro instructions from the return memory location.

The generation of application programs using understandable native instructions is provided for by the present invention. Programs can now be developed that are more compact and that will execute faster because no translation is required.

And as the example of FIG. 6 illustrates, comprehensive native resource routines can be generated using micro code after the microprocessor 310 has been committed to production. This is particularly advantageous because micro instructions allow native resources to be explicitly specified. Consequently, the generation of application programs to test and exploit native resources 319 within a microprocessor 310 according to the present invention no longer requires the level of technical expertise that has heretofore been required.

Figure 7:
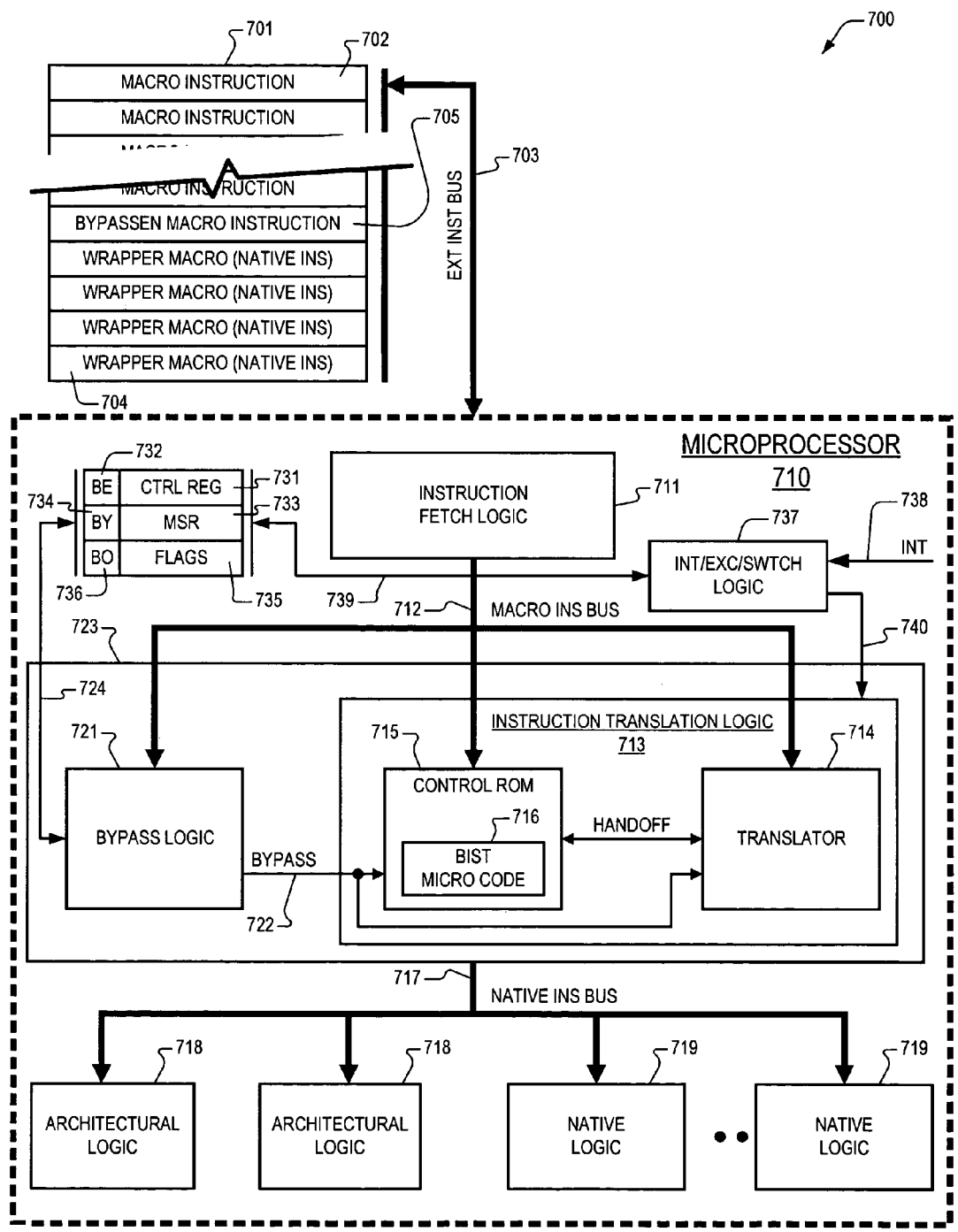
FIG. 7 is a block diagram of an alternative embodiment of a microprocessor according to the present invention for executing application programs consisting of native instructions, where execution of the application programs is compatible with concurrent execution of legacy operation systems and features.

Now turning to FIG. 7, a block diagram 700 is presented featuring an alternative embodiment of a microprocessor 710 according to the present invention for executing application programs consisting of native instructions, where execution of the application programs is compatible with concurrent execution of legacy operating systems and application programs invoked by those operating systems. The present inventors have observed that many present day application programs which would benefit from application of the invention described herein are typically executed under a multi-tasking operating system environment where executing programs are interrupted frequently and control is transferred to operating system software such as Windows XP™ for servicing of interrupts, exceptions, task switches, and the like. And since native resources are often employed to affect the operations directed by macro instructions, it is incumbent on the present invention to provide a technique whereby application programs that employ native instruction bypass according to the present invention can execute in complete compatibility with legacy multi-tasking operating systems. Accordingly, a mechanism is provided to allow interrupts, exceptions, and other forms of task switches to occur during execution of application programs that include native instructions, where subsequent execution of an application program to which control is passed is not disadvantageously affected. Furthermore, it is desired that, upon return of control from an interrupting application to an application that employs native bypass mode instructions, the native bypass application be informed of the possible perturbation of native resources as a result of having executed the interrupting application.

The alternative microprocessor 710 includes instruction fetch logic 711 that provides an output to a macro instruction bus 712. The instruction fetch logic 710 is logic, circuits, devices, or microcode (i.e., micro instructions or native instructions), or a combination of logic, circuits, devices, or microcode, or equivalent elements that are employed to fetch instructions 702, 704, 705 from memory 702. The elements employed to fetch the instructions 702, 704, 705 in the instruction fetch logic 711 may be shared with other circuits, microcode, etc., that are employed to perform other functions. Fetched macro instructions 702, 705 and fetched native instructions 704 are provided over the macro instruction bus 712 to translate stage logic 723. The translate stage logic 723 includes logic, circuits, devices, or microcode (i.e., micro instructions or native instructions), or a combination of logic, circuits, devices, or microcode, or equivalent elements that are employed to translate the fetched instructions 702, 704, 705 into corresponding sequences of native instructions. The elements employed to translate instructions 702, 704, 705 in the translation stage logic 723 may be shared with other circuits, microcode, etc., that are employed to perform other functions. Within the translate stage logic 723, instructions are distributed to instruction translation logic 713 and bypass logic 721. The bypass logic 721 is coupled to the instruction translation logic 713 via a bypass signal group 722, BYPASS. The instruction translation logic 713 includes a translator 714 and a control ROM 715. The control ROM 715 contains built in self test (BIST) native instructions 716. The translate stage logic 723 issues native instructions over a native instruction bus 717 to both architectural resources 718 and native resources 719 within the microprocessor 710. The alternative microprocessor 710 also includes a control register 731, a machine specific register 733, and a flags register 735. The control register 731 includes a bypass enable bit BE 732. The machine specific register 733 includes a bypass set bit BY 734. The flags register 735 has a bypass on bit BO 736. The registers 731, 733, 735 are accessed via bus 724 by the bypass logic 721. The microprocessor 710 has int/exc/swtch logic 737 that is coupled to internal and external program interrupting sources and events via INT bus 738. The int/exc/swtch logic 737 indicates these events to the translation logic 723 via bus 740. Bus 739 is employed by the int/exc/swtch logic 737 to access the registers 731, 733, 735.

The microprocessor embodiment 710 illustrated in FIG. 7 is provided to allow for native instructions to be easily incorporated into an application program which can be executed in a multi-tasking operating system environment. In distinction to the native bypass technique described with reference to FIGS. 3, 5, and 6, the native bypass embodiment illustrated by FIG. 7 employs a bypass enable macro instruction 705 to set the microprocessor 710 into a native instruction bypass mode. The bypass enable macro instruction, in one embodiment, is one form of an invalid or spare macro instruction provided for by the ISA to which the microprocessor 710 conforms. After the microprocessor 710 is put in native instruction bypass mode, then all subsequent instances of a wrapper macro instruction 705 are interpreted by the instruction translation logic 723 as wrappers for native instructions. In an x86-compatible embodiment, the wrapper macro instruction 705 comprises an x86 load effective address LEA instruction where the native instruction is encoded into a 32-bit displacement field of the LEA instruction. A second form of the native bypass enable macro instruction 705 (not shown in the program flow) directs the microprocessor 710 to exit the native instruction bypass mode. When not in native instruction bypass mode, all instances of the wrapper macro instruction 705 are translated according to architectural specifications of the ISA. The BY bit 734 in the machine specific register 733 can be read by application programs and is typically set during fabrication to indicate that native bypass features are provided in the microprocessor 710.

In a microprocessor 710 that has native bypass features provided, as indicated by bit BY 734 in the machine specific register 733, when the first form of the invalid/spare instruction 705 is detected by the translation stage logic, the bypass logic 721 sets bit BE 732 in the control register 731 to indicate that native bypass mode is enabled. When in native bypass mode, the bypass logic 721 detects the wrapper macro instructions 704, strips out the native instructions from within, and routes the native instructions to the native instruction bus 717, thereby circumventing the function performed by the instruction translation logic 713. All other retrieved macro instructions 702 are sequentially provided to the translate stage logic 723 over the macro instruction bus 712. The instruction translation logic 713 translates each of the macro instructions 702 and generates one or more corresponding native instructions whose execution accomplishes prescribed architectural operations using prescribed architectural resources 718. And similar to the operation of a conventional microprocessor, within the microprocessor 710 according to the present invention native instructions will often utilize native resources 719 as well to perform certain sub-operations of the prescribed architectural operations. The native instructions are thus provided to the execution logic 718, 719 in the microprocessor 710 via the native instruction bus 717. Hence, an application program that is executing on the microprocessor 710 of FIG. 7 can interlace both macro instructions 702 and native instructions (as provided within the wrapper macro instruction 704) to exploit desirable native resources 719 such as additional registers, native resource addressing conventions, and the like.

The translator 714 and the control ROM 715 within the microprocessor 710 coordinate the translation of macro instructions 702 through use of a handoff signal, HAND-OFF. In addition, the BIST micro code 716 within the control ROM 715 is automatically issued to the native instruction bus 717 upon initialization of the microprocessor 710.

When a wrapper macro instruction 704 is translated, the bypass logic 721 disables the control ROM 715 and the translator 714 via the BYPASS signal group 722. While the instruction translation logic 713 is disabled, the bypass logic 721 strips embedded native instructions from within their corresponding wrapper macro instructions 704 and routes the native instructions directly to the native bus 717.

Interrupts and other task control transfer events (hereinafter referred to as interrupts) are signaled to the int/exc/swtch logic 737 via bus 738. Bus 740 is employed to indicate the interrupts to the instruction translation logic 713. As part of processing an interrupt, the state of bit BE 732 in the control register 731 is checked to determine if the microprocessor 710 is in native bypass mode. If so, this state is saved prior to processing the interrupt by asserting bit BO 736 in the flags register 735. It is required that the flags register 735 be an architectural register within the microprocessor 710 whose state is preserved during task control transfers and whose state is restored upon control returns. In an x86 embodiment, the flags register 735 comprises the EFLAGS register in an x86-compatible microprocessor and bit BO 736 comprises bit 31 of the EFLAGS register. If an interrupt occurs when bit BE 732 is asserted (indicating that bypass mode is enabled), then the int/exc/swtch logic 737 asserts the BO bit 736 in the flags register 735 prior to processing the interrupt. In addition, bit BE 732 is cleared, thereby disabling native bypass mode. Should a wrapper macro instruction 704 be encountered within an interrupt service routine or other application to which control has been passed prior to returning from the interrupt, then the instruction translation stage 723 will interpret the wrapper macro instruction 704 according to architectural specifications of the controlling ISA. In this manner, application programs can employ embedded native instructions without causing problems for operating system modules that service these events or for other application programs to which program control is transferred.

Upon return from an interrupting event to an application program that employs native bypass mode, the int/exc/swtch logic 738 checks the state of the restored BO bit 736 in the flags register 735. If the bit 736 is set to indicate that native bypass mode was previously enabled, then bit BE 732 is set to re-enable bypass mode. Control is then returned to the application program and subsequent wrapper macro instructions 704 are again interpreted as wrappers for native instructions. The status of the BO bit 736 can also be checked by the application program that employs native bypass mode to determine if an interrupt has occurred that may have changed the state or contents of any native resource that was being used prior to the interrupt occurring. Since native resources are not architecturally specified to persist through interrupting events, an interrupt handler or other application program to which program control was transferred may have changed the state of a native resource currently being used by the application program that employs bypass mode. In an alternative embodiment, the flags register 735 comprises a native register within the microprocessor 710 whose contents are cleared by execution of a native instruction within an application employing native bypass mode. According to the alternative embodiment, the int/exc/swtch logic 737 sets the value of this native register 735 to a non-zero value upon return from interrupt, thereby providing a means whereby the native bypass application can determine if an interrupt has occurred. In a further embodiment. The flags register 735 comprises both an architectural flags register having a BO bit 736 and a native register that operate as described above to provide two indications to a native bypass application that an interrupt has occurred.

Figure 8:
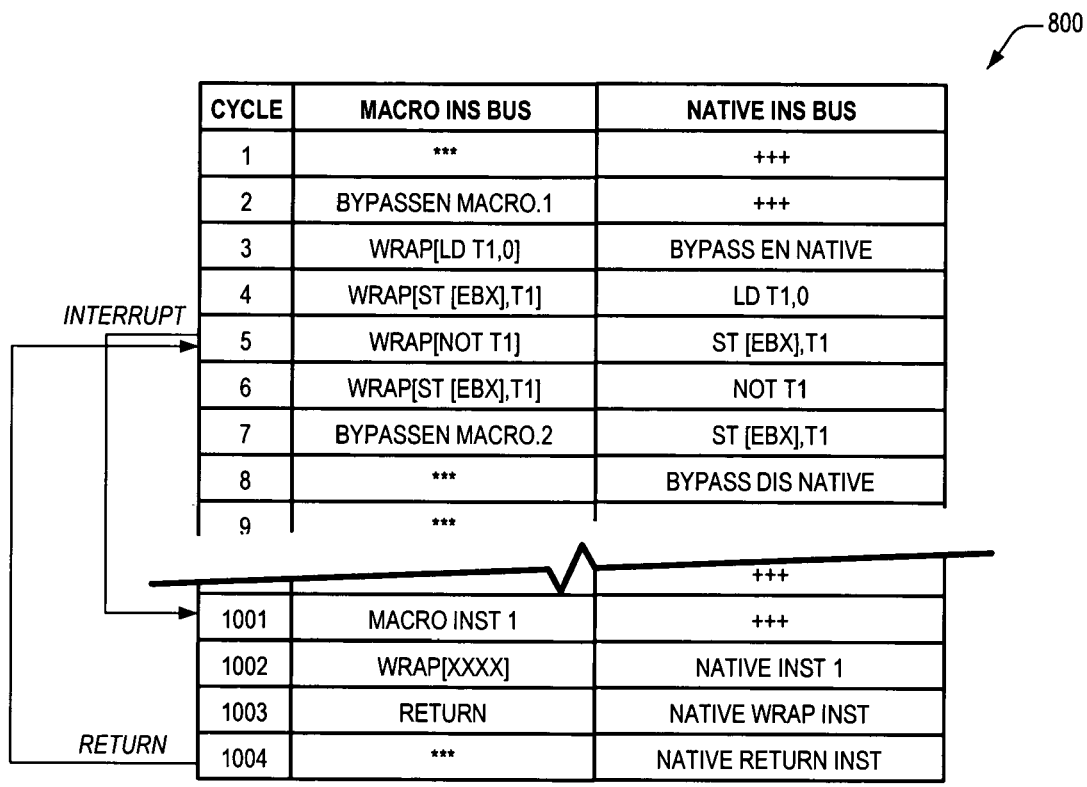
FIG. 8 is a timing diagram illustrating how a native bypass instruction sequence is employed to directly prescribe native registers within the microprocessor of FIG. 7 in the presence of an interrupt handled by a legacy operating system.

Now referring to FIG. 8, a timing diagram 800 is presented illustrating how a native bypass instruction sequence is employed to directly prescribe native registers within the microprocessor 710 of FIG. 7 in the presence of an interrupt handled by a legacy operating system. The timing diagram 800 depicts two columns related to the flow of instructions through the microprocessor 710: a column entitled "Macro Ins Bus" and a column entitled "Native Ins Bus." The Macro Ins Bus column depicts macro instructions that have been retrieved from memory 701 by the fetch logic 711 and which are provided to the instruction translation logic 713 over the macro instruction bus 712. The Native Ins Bus column show the resulting native instructions that are generated by the translate stage logic 723 and which are provided to the native instruction bus 717. Flow of the instructions is depicted with respect to cycles of a microprocessor clock signal. Non-relevant macro instructions before and after instructions of interest are designated by the marks "***". Non-relevant native instructions are designated by the marks "+++".

During cycle 2, a first form of a bypass enable macro instruction, designated BYPASSEN MACRO.1, is provided over the macro instruction bus 712. More specifically, the first form of the bypass enable macro instruction directs a microprocessor 710 having bypass features provided to enter into a native instruction bypass mode. The first form of the native bypass enable macro instruction is employed within an application program where one or more wrapper instructions follow having embedded native instructions. Accordingly, translation stage logic 723 issues a bypass enable native instruction BYPASS EN NATIVE during the following cycle whose execution sets the microprocessor 710 into native instruction bypass mode by asserting bit BE 732 of the control register 731.

During cycle 3, a first wrapper macro instruction, designated WRAP [LD T1, 0], is fetched for translation. According to the present invention, the first wrapper macro instruction embeds a first native instruction LD T1, 0 into a field of an existing macro instruction within the ISA. Since the microprocessor 710 is in native bypass mode, the bypass logic 721 strips out the first native instruction LD T1, 0 from within the first wrapper macro instruction, and issues it to the native instruction bus 717 during the following cycle. Translation of the wrapper instruction is thereby bypassed.

During cycle 4, a second wrapper macro instruction, designated WRAP [ST [EBX], T1], is fetched for translation. And because the microprocessor is still in native bypass mode, the bypass logic 721 strips out a second native instruction ST [EBX], T1 from within the second wrapper macro instruction, and issues it to the native instruction bus 717 during the following cycle.

During cycle 5, a third wrapper macro instruction, designated WRAP [NOT T1], is fetched for translation. And because the microprocessor is still in native bypass mode, the bypass logic 721 strips out a third native instruction NOT T1 from within the third wrapper macro instruction, and issues it to the native instruction bus 717. At this point, an interrupting event occurs that is detected by the int/exc/swtch logic 737 and program control is vectored to an interrupt service routine sequence of macro instructions designated at clock cycles 1001–1004. Prior to transferring program control, however, the microprocessor 710 asserts bit BO 736 in the flags register 735 and saves its state and additionally clears bit BE 732 in the control register 731 thereby disabling native bypass mode.

Processing picks up at cycle 1001, where a first macro instruction within the interrupt service routine, designated MACRO INST 1 is provided for translation. Accordingly, the translation stage logic 723 translates this first macro instruction into a corresponding native instruction, designated NATIVE INST 1, and issues it to the native instruction bus 717 during the next cycle.

During cycle 1002, a fourth wrapper macro instruction WRAP[XXXX] is provided for translation. And because native bypass mode has been disabled, the translation stage logic 723 translates the fourth wrapper macro instruction into a corresponding native wrapper instruction NATIVE WRAP INST that specifies operations according to the ISA. The native wrapper instruction is issued to the native instruction bus 717 during the following cycle.

During cycle 1003, a return macro instruction RETURN is provided for translation. Accordingly, the translation stage logic 723 translates the return macro instruction RETURN into a native return instruction NATIVE RETURN INST and issues it to the native instruction bus 717 during the following cycle.

During cycle 1004, the native return instruction NATIVE RETURN INST is executed and causes program control to be returned to execution of the instruction interrupted during cycle 5. Prior to transferring control, however, the int/exc/swtch logic 737 checks bit BO 736 in the flags register 735 that is being restored and determines that native bypass mode was previously enabled. Accordingly, bit BE 732 in the control register 731 is again asserted and control is passed to the application that is employing native bypass mode.

Translation of the third wrapper instruction is completed during cycle 5.

During cycle 6, fifth wrapper instruction WRAP[ST [EBX], T1] is provided for translation. And since the microprocessor 710 has been returned to native bypass mode, a fifth native instruction ST [EBX, T1] is stripped from within the fifth wrapper instruction and is provided to the native instruction bus 717 during the next cycle.

During cycle 7, a second form of the bypass enable macro instruction BYPASEN MACRO.2 is provided for translation. Accordingly, the translation stage logic 723 generates a bypass disable native instruction BYPASS DIS NATIVE and issues it to the native instruction bus 717 during the next cycle, thus causing bit BE 732 to be cleared and thus, the microprocessor exits native instruction bypass mode.

The generation of application programs using understandable native instructions is provided for by the present invention. Programs can now be developed that are more compact and that will execute faster because no translation is required. The present invention provides advantages to application programs by allowing the direct prescription of native resources, addressing modes, instruction syntax, and the like. Application programmers can furthermore employ native bypass mode according to the present invention to obfuscate proprietary code segments, thus frustrating piracy attempts.

Those skilled in the art should appreciate that they can readily use the disclosed conception and specific embodiments as a basis for designing or modifying other structures for carrying out the same purposes of the present invention without departing from the spirit and scope of the invention as defined by the appended claims.

What is claimed is:

1. An apparatus in a microprocessor for executing native instructions that are provided directly to the microprocessor via an external instruction bus, the apparatus comprising:
    instruction translation logic, configured to retrieve macro instructions provided via the external instruction bus, and configured to translate each of said macro instructions into associated native instructions for execution, wherein, if a first form of a first macro instruction is retrieved, said instruction translation logic directs the microprocessor to enable a native bypass mode and indicates such by asserting a first bit within a control register; and
    bypass logic, coupled to said instruction translation logic, configured to access said first bit within said control register to determine if said native bypass mode has been enabled, and to detect wrapper macro instructions and, upon detection of said wrapper macro instructions, to disable said instruction translation logic, and to provide the native instructions for execution by the microprocessor, thereby bypassing said instruction translation logic;
    wherein said wrapper macro instructions are existing macro instructions which are translated by said instruction translation logic according to architectural specifications if said native bypass mode has not been enabled.

2. The apparatus as recited in claim 1, wherein the native instructions are embedded within said wrapper instructions and are provided from a memory to the external instruction bus.

3. The apparatus as recited in claim 1, wherein the microprocessor employs a second bit within a flags register to indicate the occurrence of an interrupting event.

4. The apparatus as recited in claim 3, further comprising:
    interrupt/exceptionl/switch logic, configured to clear said first bit within said control register upon occurrence of said interrupting event and prior to transferring control to an interrupt event service routine, thereby disabling said native bypass mode, and configured to assert said second bit within said flags register, thereby indicating occurrence of said interrupting event.

5. The apparatus as recited in claim 4, wherein said flags register comprises an x86 EFLAGS register, and wherein said second bit comprises bit 31 within said x86 EFLAGS register.

6. The apparatus as recited in claim 1, wherein said bypass logic comprises:
    a native instruction router, coupled to mode detection logic, configured to receive said wrapper macro instructions, and configured to strip the native instructions from within said wrapper macro instructions, and configured to route the native instructions to a native instruction bus.

7. The apparatus as recited in claim 1, wherein, if a second form of said first macro instruction is retrieved, said instruction translation logic directs the microprocessor to disable said native bypass mode and indicates such by clearing said first bit within said control register.

8. An apparatus, for allowing a micro instruction to be directly provided from an external instruction bus to execution logic within a pipeline microprocessor, the apparatus comprising:
   a translator, for receiving macro instructions from a macro instruction bus, and for translating each of said macro instructions into associated micro instructions, said associated micro instructions being provided to the execution logic via a micro instruction bus; and
   bypass logic, coupled to said translator, for routing the micro instruction to the execution logic, said bypass logic comprising:
      a mode detector, for detecting a native bypass mode, and for detecting a wrapper macro instruction, and for directing that said translator cease instruction translation, wherein said wrapper macro instruction is an existing macro instructions which would otherwise be translated by said translation logic according to architectural specifications if said native bypass mode is not enabled; and
      native instruction routing logic, coupled to said mode detector, for receiving said wrapper macro instruction from said macro instruction bus, and for providing said micro instruction to said micro instruction bus, thereby circumventing said translator.

9. The apparatus as recited in claim 8, wherein the micro instruction is embedded within said wrapper macro instruction.

10. The apparatus as recited in claim 9, wherein said wrapper macro instruction comprises and x86 load effective address (LEA) instruction, and wherein said micro instruction is embedded within a 32-bit displacement field of said LEA instruction.

11. The apparatus as recited in claim 8, wherein said mode detector detects said native bypass mode by evaluating the state of a fir si bit within a control register.

12. The apparatus as recited in claim 11, wherein said first bit is asserted as a result of translating a first form of a first macro instruction.

13. The apparatus as recited in claim 12, wherein said first bit is cleared as a result of translating a second form of said first macro instruction.

14. The apparatus as recited in claim 13, wherein said first macro instruction comprises an invalid or spare macro instruction within an existing instruction set architecture to which the pipeline microprocessor conforms.

15. The apparatus as recited in claim 8, wherein the pipeline microprocessor employs a second bit within a flags register to indicate the occurrence of an interrupting event.

16. The apparatus as recited in claim 15, further comprising:
   interrupt/exceptionl/switch logic, configured to clear a first bit within a control register upon occurrence of said interrupting event and prior to transferring control to an interrupt event service routine, thereby disabling said native bypass mode, and configured to assert said second bit within said flags register, thereby indicating occurrence of said interrupting event.

17. The apparatus as recited in claim 15, wherein said flags register comprises an x86 EFLAGS register, and wherein said second bit comprises bit 31 within said x86 EFLAGS register.

18. A method for providing a plurality of native instructions stored in a memory directly to a microprocessor for execution, the method comprising:
   enabling a native instruction bypass mode within the microprocessor;
   embedding the plurality of native instructions within a corresponding plurality of wrapper instructions and providing the corresponding plurality of wrapper instructions to the the microprocessor, wherein the corresponding plurality of wrapper instructions are existing macro instructions, and wherein the corresponding plurality of wrapper instructions would otherwise be translated by instruction translation logic according architectural specifications in the absence of said enabling; and
   within the microprocessor, detecting the native instruction bypass mode and extracting the plurality of native instructions from within the corresponding plurality of wrapper instructions.

19. The method as recited in claim 18, wherein said enabling comprises:
   detecting a first form of an otherwise invalid or spare macro instruction; and
   asserting a bit within a control register to indicate that the microprocessor is in a the native instruction bypass mode.

20. The method as recited in claim 18, wherein said embedding comprises:
   encoding each of the plurality of native instructions within a field of the corresponding plurality of wrapper instructions, wherein each of the corresponding plurality of wrapper instructions comprises an otherwise valid macro instruction.

21. The method as recited in claim 20, wherein the otherwise valid macro instruction comprises an x86 load effective address instruction, and wherein the field comprises a displacement field.

22. The method as recited in claim 18, further comprising:
   upon detection of an interrupting event asserting a bit within a flags register and disabling the native instruction bypass mode; and
   upon return from an interrupting event, evaluating the bit within the flags register and re-enabling the native instruction bypass mode.

23. The method as recited in claim 19, wherein the flags register comprises an x86 EFLAGS register, and where the bit comprises bit 31 within the x86 EFLAGS register.

* * * * *